Nov. 27, 1934.  R. F. KOHR  1,981,957

BRAKE

Original Filed April 27, 1931

INVENTOR.
ROBERT F. KOHR
BY
ATTORNEY.

Patented Nov. 27, 1934

1,981,957

UNITED STATES PATENT OFFICE 1,981,957

BRAKE

Robert F. Kohr, South Bend, Ind., assignor to Bendix Brake Company, South Bend, Ind., a corporation of Illinois Application April 27, 1931, Serial No. 533,243
Renewed February 8, 1934

10 Claims. (Cl. 188—78)

This invention relates to brakes and more particularly to internal expanding brakes.

Broadly, the invention comprehends means for applying the friction elements of an internal expanding brake including tension and compression members connected to one of the friction elements.

In the illustrated embodiment a semi-flexible friction element having separable ends is supported by suitable steady rests on a fixed support such as a backing plate for cooperation with a rotatable drum. The backing plate has positioned thereon between the separable ends of the friction element a fixed anchor upon which the friction element anchors at one end when the drum is turning in one direction and at the other end when the drum is turning in the reverse direction.

The friction element has threaded in one end a screw provided with a head having a recess for the reception of a plunger positioned for reciprocation in the anchor and secured to the other end of the friction element is a conduit in which is positioned a cable connected to a lever pivoted on the web of the friction element and engaging the plunger. When the cable is placed under tension the conduit is placed under compression. The conduit transmits force to one end of the friction element and the cable transmits force to its other end. This results in spreading the friction element into drum engagement.

An object of the invention is to provide means for applying the friction elements of a brake with a smooth action devoid of grabbing and clicking.

A further object of the invention is to provide means for applying the friction elements of a brake including tension and compression members arranged to apply force to the separable ends of the friction element in opposite directions, so that movement of the separable ends of the friction element may be concomitant with an equal distribution of applied force resulting in a smooth application of the friction element.

Other objects of the invention will appear from the following description taken in connection with the drawing which forms a part of this specification, and in which.

Figure 1:
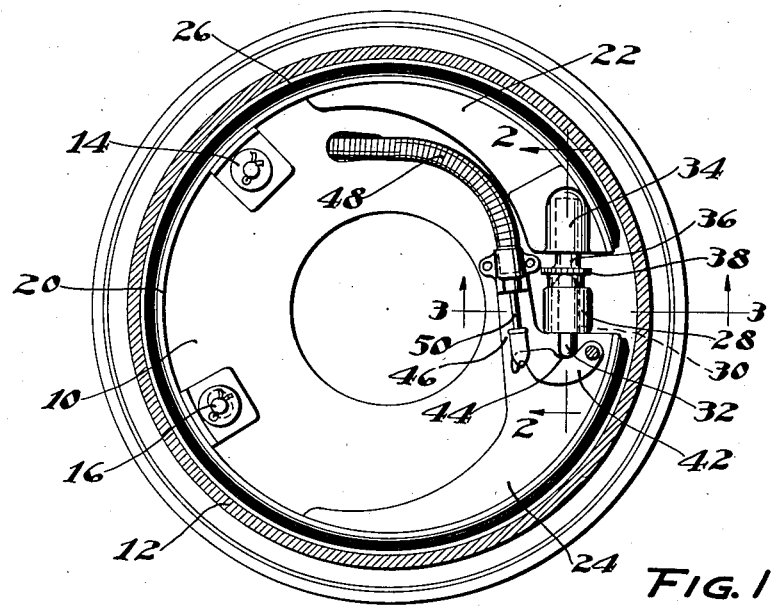
Figure 1 is a vertical sectional view taken just back of the head of the drum illustrating the friction element in side elevation and showing the invention as applied.
Figure 2:
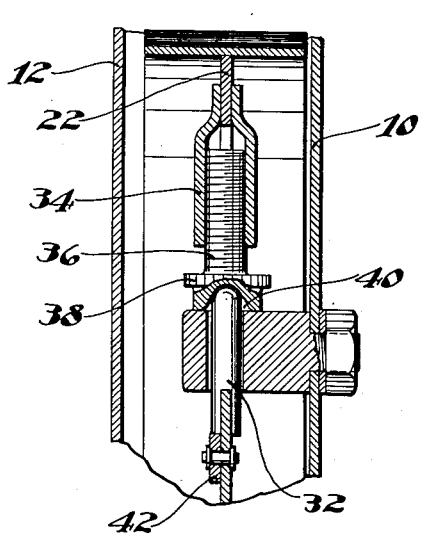
Figure 2 is a section substantially on line 2—2, Figure 1.
Figure 3:
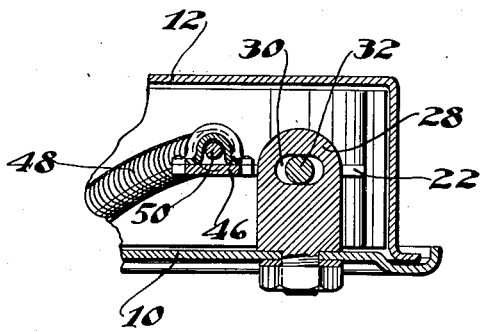
Figure 3 is a section substantially on line 3—3, Figure 1.

Referring to the drawing for more specific details of the invention, 10 represents a fixed support such as a backing plate. Associated with the backing plate is a rotatable drum 12 and supported for movement on the backing plate by suitable steady rests 14 and 16 is a friction element comprising a band 20 having separable ends provided with reinforcing webs 22 and 24. The band has suitably secured thereto a lining 26 adaptable for cooperation with the braking surface of the drum.

As shown, a fixed anchor 28 is positioned on the backing plate between the separable ends of the friction elements. This anchor has a transverse opening 30, preferably rectangular in general contour and positioned for reciprocation in the opening is a plunger 32 which owing to the contour of the opening may rock on its longitudinal axis.

Positioned on the web 22 is a sleeve 34 preferably formed with two plates spot welded to the web and provided with semicylindrical registering portions adaptable for the reception of an adjusting screw 36 provided with a head 38 having a recess 40 receiving one end of the plunger 32 and pivoted to the web 24 is a lever 42 having a notch 44 receiving the other end of the plunger. The web 24 has an extension 46 to which is suitably secured a conduit 48 having positioned therein a cable 50 suitably connected to the lever.

In operation, when the cable 50 is placed under tension the lever 40 is moved to apply force to the plunger 32 and the plunger transmits this force to one end of the friction element through the adjusting screw, and simultaneously with this the conduit 48 tends to straighten and imposes compression to the other end of the friction element, so that the separable ends of the friction elements may be spread simultaneously or substantially simultaneously to engage the braking surface of the drum. By reason of the reciprocation of the plunger and allowance made for longitudinal movement thereof there is provided a balance action between the separable ends of the friction elements.

Although this invention has been described in connection with certain specific embodiments, the principles involved are susceptible of numerous other applications that will readily occur to persons skilled in the art. The invention is, therefore, to be limited only as indicated by the scope of the appended claims.

It is not my intention to claim herein any subject-matter disclosed in application No. 469,522, filed July 21, 1930, by A. Y. Dodge.

Having thus described the various features of the invention, what I claim as new and desire to secure by Letters Patent is:

1. A brake comprising a friction element, an anchor between the ends of the said element, and means for actuating the element including means imposing separate forces in opposite directions concomitantly and including a conduit reacting on one end of the friction element and means passing through the anchor and actuated by a cable in said conduit to apply the other end of the friction element.

2. A brake comprising a friction element having separable ends, a compression member secured to one end, a lever pivoted on the friction element, a tension member supported by the compression member and connected to the lever and a movable member between the lever and the other end of the friction element.

3. A brake comprising a friction element having separable ends, an adjusting member on one end, a compression member connected to the other end, a lever pivoted on the friction element, a tension member extending through the compression member and connected to the lever, and a movable member between the lever and the adjusting member.

4. A brake comprising a fixed support, a friction element having separable ends means for retaining the element on the support, an anchor on the support between the separable ends, an adjusting member threaded in one end of the friction element adapted to engage the anchor, a lever pivoted on the friction element, a plunger between the lever and the adjusting member, a conduit attached to the other end of the friction element, and a tension member extending through the conduit and connected to the lever.

5. A brake comprising a fixed support, a friction element having separable ends positioned for movement thereon, an anchor on the support between the separable ends, a plunger movable in the anchor, an adjusting screw threaded in one end of the friction element adapted to engage the anchor, and to receive one end of the plunger, a lever pivoted on the friction element engaging the other end of the plunger, a conduit connected to the other end of the friction element, and a cable extending through the conduit and connected to the lever.

6. A brake comprising a fixed support, a friction element having separable ends, means for supporting the friction element on the support, an anchor positioned between the separable ends of the friction element, a screw threaded in one end of the friction element, a plunger movable through the anchor having one end engaging the screw, a lever pivoted on the other end of the friction element engaging the other end of the screw, a compression member connected to the friction element, and a tension member supported by the compression member and connected to the lever.

7. A brake comprising a fixed support, a drum associated therewith, a friction element on the support adaptable for cooperation with the drum, an anchor on the support between separable ends of the friction element, an adjusting member on one end of the friction element, a lever pivoted to the other end of the friction element, a plunger movable through the anchor having one end engaging the adjusting member and its other end engaging the lever, a conduit connected to the friction element, and a cable extending through the conduit and connected to the lever.

8. A brake comprising a fixed support, a rotatable drum associated therewith, a friction element adaptable for cooperation with the drum, means for retaining the friction element on the support, an anchor on the support between separable ends of the friction element, an adjusting screw threaded in one end of the friction element, a lever pivoted on the other end of the friction element, a plunger movable through the anchor having one end engaging the adjusting screw and its other end engaging the lever, a conduit attached to the friction element and a cable extending through the conduit and connected to the lever.

9. A brake comprising a backing plate having friction means mounted thereon and which means has separable ends, a solid anchor mounted on said plate and arranged between said ends and formed with a transverse opening, and applying means for said ends including a lever mounted on one of said ends and a threaded adjustably-extensible thrust device extending through said opening and engaged by said lever and in thrust engagement with the other of said ends and having a part anchoring against one side of the anchor adjacent said opening to transmit to said side of the anchor the torque of said other end, the end of the friction means on which the lever is mounted being in direct anchoring engagement with the other side of the anchor.

10. A brake comprising a backing plate having friction means mounted thereon and which means has separable ends, one of which is provided with a threaded part, an anchor mounted on said plate and arranged between said ends and formed with a transverse opening, and applying means for said ends including a lever mounted on the other one of said ends and a thrust device including a member extending through said opening and engaged by said lever and another member in thrust engagement with the first member and having a portion anchoring against one side of the anchor adjacent said opening to transmit to said side of the anchor the torque of said other end and which is in threaded adjustable engagement with said threaded part, the end of the friction means on which the lever is mounted being in direct anchoring engagement with the other side of the anchor.

ROBERT F. KOHR.